United States Patent
Gu et al.

(10) Patent No.: US 11,878,377 B2
(45) Date of Patent: Jan. 23, 2024

(54) METHOD FOR WELDING IRON-ALUMINUM INTERMETALLIC COMPOUND MICROPOROUS MATERIAL AND WELDED PART MADE THEREBY

(71) Applicant: AT&M ENVIRONMENTAL ENGINEERING TECHNOLOGY CO., LTD., Beijing (CN)

(72) Inventors: Hu Gu, Beijing (CN); Junjun Yang, Beijing (CN); Fan Wang, Beijing (CN); Guanying Liu, Beijing (CN); Yu Zhang, Beijing (CN); Ying Dai, Beijing (CN); Xuan Yang, Beijing (CN); Kun Wang, Beijing (CN); Shiyu Lin, Beijing (CN)

(73) Assignee: AT&M ENVIRONMENTAL ENGINEERING TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/791,492

(22) PCT Filed: Jun. 4, 2020

(86) PCT No.: PCT/CN2020/094402
§ 371 (c)(1),
(2) Date: Jul. 7, 2022

(87) PCT Pub. No.: WO2021/139080
PCT Pub. Date: Jul. 15, 2021

(65) Prior Publication Data
US 2023/0123302 A1    Apr. 20, 2023

(30) Foreign Application Priority Data

Jan. 10, 2020    (CN) .......................... 202010028166.X

(51) Int. Cl.
*B23K 9/133* (2006.01)
*B23K 9/16* (2006.01)
(Continued)

(52) U.S. Cl.
CPC ................ *B23K 9/133* (2013.01); *B23K 9/16* (2013.01); *B23K 9/287* (2013.01); *B23K 10/02* (2013.01); *B23K 26/20* (2013.01)

(58) Field of Classification Search
CPC .......... B23K 9/16; B23K 9/133; B23K 9/287; B23K 10/02; B23K 26/20; B23K 2103/04;
(Continued)

(56) References Cited

U.S. PATENT DOCUMENTS

| 2011/0123825 A1 | 5/2011 | Sakurai et al. |
| 2015/0258629 A1* | 9/2015 | Radis ................... B23K 20/002 285/288.1 |

FOREIGN PATENT DOCUMENTS

| CN | 1251329 A | 4/2000 |
| CN | 101195187 A | 6/2008 |

(Continued)

OTHER PUBLICATIONS

Machine Translation of Li (CN 101195187) performed on Apr. 5, 2023 (Year: 2008).*

(Continued)

*Primary Examiner* — Brian W Jennison
(74) *Attorney, Agent, or Firm* — Dragon Sun Law Firm, PC; Nathaniel Perkins

(57) ABSTRACT

The present invention discloses a method for welding Fe—Al intermetallic compound microporous material and a welded part made thereby, and the present invention relates to the field of welding technology. For the problem in the prior art that there is great difficulty in welding between (Continued)

Fe—Al microporous material and dense stainless steel, the method for welding Fe—Al intermetallic compound microporous material, in accordance with the present invention, comprises the following steps: turning on "welding torch fuel-gas" of a fusion-welding machine, and turning on welding shielding gas in a shield; adjusting welding parameters of the welding machine and parameter of the welding shielding gas in the shield for a fusion welding process; switching on the welding machine, and using welding wire as welding filler for welding Fe—Al intermetallic compound microporous material to dense stainless steel; and, cooling after completion of the welding.

18 Claims, 4 Drawing Sheets

(51) Int. Cl.
*B23K 9/28* (2006.01)
*B23K 10/02* (2006.01)
*B23K 26/20* (2014.01)

(58) Field of Classification Search
CPC ............ B23K 2103/05; B23K 2103/24; B23K 2103/20; B23K 2103/18
See application file for complete search history.

(56) References Cited

FOREIGN PATENT DOCUMENTS

| | | |
|---|---|---|
| CN | 103231160 A | 8/2013 |
| CN | 103624354 A | 3/2014 |
| CN | 107876948 A | 4/2018 |
| CN | 111151842 A | 5/2020 |
| WO | 2014013788 A1 | 1/2014 |

OTHER PUBLICATIONS

Machine Translation of Gao (CN 107876948) performed on Apr. 5, 2023 (Year: 2018).*
International Search Report of PCT/CN2020/094402.
Written Opinion of PCT/CN2020/094402.

* cited by examiner

METHOD FOR WELDING IRON-ALUMINUM INTERMETALLIC COMPOUND MICROPOROUS MATERIAL AND WELDED PART MADE THEREBY

CROSS-REFERENCE TO RELATED APPLICATIONS

This Application is a national stage application of PCT/CN2020/094402. This application claims priorities from PCT Application No. PCT/CN2020/094402, filed Jun. 4, 2020, and from the Chinese patent application 202010028166.X filed Jan. 10, 2020, the content of which are incorporated herein in the entirety by reference.

TECHNICAL FIELD

The present disclosure relates to the field of welding technology, in particular to the field of welding of an iron-aluminum-based (hereinafter referred to as Fe—Al) intermetallic compound microporous material, and more specifically to the field of welding of a Fe—Al intermetallic compound microporous material to dense stainless steel (i.e., solid stainless steel).

BACKGROUND

A Fe—Al intermetallic compound (such as $Fe_3Al$, FeAl, $FeAl_2$, $Fe_2Al_5$, $FeAl_3$, etc.) is a type of low-density material between metal and ceramic, also called "semi-ceramic", which has not only the advantages of metal materials, such as good ductility, high strength, good processing performance, high thermal shock resistance, weldability, etc., but also the characteristics of ceramic materials, such as good thermal stability, high resistance to oxidation and corrosion, good wear resistance, etc., and is especially suitable for precision filtration and gas-solid separation in high-temperature, high-pressure and corrosive environments. Therefore, Fe—Al intermetallic compounds as microporous functional materials are widely valued and studied, as high-temperature dust-removal application areas continue to expand.

Results of existing experimental studies show that, Fe—Al intermetallic compounds have poor weldability, which is also one of the key factors limiting the application of Fe—Al intermetallic compounds as engineering materials. In fusion welding, the main problems are cold cracking and hot cracking. For addressing the cold-cracking and hot-cracking problems, main measures taken so far are reducing source of diffused hydrogen in a molten weld pool, strengthening protection of a molten pool, weakening constraint stress (thermal stress) and post-weld residual stress in a joint area during a welding process, and optimizing composition and organizational properties of metal in weld seam, etc.

Liu Liangzhi et al. presented in "GTA Welding and Weldability of Fe—Al Alloy" (see "Mechanical Science and Technology for Aerospace Engineering", 1996, Vo 1. 15, No. 4) that an experimental study of the welding of Fe—14Al-10Mn—Cr plates was carried out using argon arc welding, with welding filler material φ2 mm 1Cr18Ni9Ti, Y-Type 1.5×45° groove, specimen gap 2.0-2.5 mm, and Ar gas flow rate 10 L/min Results of the experimental study show that: compared with no pre-weld heat treatment, preheating treatment at a relatively high temperature (400° C.) before welding can improve plasticity of welded parts during a welding process, and reduce welding stress caused by uneven temperature on the welded parts, thus reducing tendency of hot cracking during Fe—Al welding; meanwhile, a relatively high temperature (400° C.) heat treatment immediately after welding can effectively remove residual stress in the welded parts, thus preventing expansion of micro-cracks and generation of cold cracks in the welded parts during post-weld cooling and placement; the resulting welding joints can reach a tensile strength of more than 80% of the base material strength.

O. Torun et al. presented in "Diffusion bonding of iron aluminide $Fe_{72}Al_{28}$ using a pure iron interlayer" (see "Intermetallics", Volume 13, Issue 8, August 2005, Pages 801-804) that autogenous welding of $Fe_{72}Al_{28}$ Alloy was carried out using diffusion welding, under a pressure of 3.2 MPa and temperature held at 1100° C. for 4 h, and a relatively excellent welding joint was obtained with a post-weld tensile strength reaching 396 MPa, which is 86% of the tensile strength of the base material. The study conclude that, the only way to obtain a joint with good bonding properties is to use high temperature, high pressure and a long time of specific process parameters, and only in this way can a relatively ideal joint be obtained. However, such harsh welding conditions are not only costly and inefficient, but also difficult to achieve on components with a slightly more complex structure, thus are inadvisable for promotional use in engineering.

Gao Haiyan et al. presented in the "Research on Fe—Al intermetallic porous materials" (see "Central South University", 2009, PhD thesis) that research on weldability of Fe—Al intermetallic compound microporous materials was conducted using self-made Cu-10 wt % Sn powder pressed billet as brazing filler, with brazing mechanism being inter-diffusion and reaction between elements of both the brazing filler and the base Fe—Al porous materials. The research's conclusion is as follows: good homogenous brazing joint as well as heterogeneous brazing joints brazed to stainless steel can be obtained for Fe—Al microporous materials, with tensile strengths of the homogenous and heterogeneous brazed joints reaching 75.0 MPa and 83.9 Mpa respectively, which are 81.5% and 91.2% of the tensile strength of the Fe—Al microporous material matrix respectively; after heterogeneous brazing of the Fe—Al microporous materials to stainless steel, the organizational structure of the diffusion layer at the weld seam (the weld seam here is the stainless steel/porous Fe—Al joint brazed) is S—S+(Cu, Sn)/(Cu, Sn)/$Cu_9Al_4$+(Cu, Fe)+(Cu, Sn)/$AlFe_3$+$Al_4Cu_9$+(Cu, Sn), and weakness surface (in terms of weld-strength) is the brazing filler/Fe—Al bonding interface, whereas after homogenous brazing of the Fe—Al microporous materials, the organization structure of the diffusion layer at the weld seam (the weld seam here is the porous Fe—Al/porous Fe—Al joint brazed) is (Cu, Sn) solid solution phase coexisting with Cu—Sn intermetallics, and the weakness surface (in terms of weld-strength) is the center of the weld seam (here, that is the center of the filler). The main problem in brazing and diffusion welding is the difficulty in obtaining good mechanical properties in a welding joint area. Main measures for solving the problem in brazing and diffusion welding are improving welding parameters and developing new types of brazing fillers. Although the above measures have some effect, but mostly they increase difficulty of process, making welding conditions harsh, or costly and inefficiency, and therefore, in practical applications they are largely limited or even difficult to implement. In summary, current research on welding issues of Fe—Al intermetallic compounds are still very limited, most of which is about dense-part-to-dense-part welding, meanwhile, research about welding of Fe—Al intermetallic compound microporous materials to solid part is also basically focused on study of brazing process, which has not yet achieved engineering application.

Microporous materials have many differences from dense materials, the main difference is that microporous materials have a microporous structure, and these microporous will have a severe impact on welding or other connection methods. Regarding the impact on welding, as the rate of heat transfer in microporous material is related to the porosity of the material, the presence of a large number of pores makes it difficult to form a continuous and stable molten pool during welding, resulting in a reduction in mechanical properties of a connecting joint. In addition, because Fe—Al and dense stainless steel has a large difference in coefficient of thermal expansion, making a welding process and a subsequent cooling process prone to occurrence of cold cracking and hot cracking at a weld seam; moreover, in Fe—Al microporous materials, due to the high activity of Al elements and the existence of many pores in the microporous material itself, if not properly protected, it is prone to formation of $Al_2O_3$, which would cause the phenomenon of non-melting or molten pool discontinuity in a welding process; all these factors have led to great difficulty in welding between Fe—Al microporous materials and dense stainless steel.

SUMMARY

To realize engineering application of Fe—Al microporous materials, connection problems between them and dense stainless steel must be solved. Therefore, the present disclosure is of great importance for engineering application of Fe—Al intermetallic compound microporous materials.

According to the present disclosure, provided is a method for welding Fe—Al intermetallic compound microporous material to dense stainless steel, characterized in that, the welding method comprises the steps of: turning on "welding torch fuel-gas" of a fusion-welding machine, and turning on welding shielding gas in a shield; adjusting welding parameters of the welding machine and parameter of the welding shielding gas in the shield for a fusion welding process; adjusting welding torch position, pressing an arc start switch, and using welding wire as welding filler for welding the Fe—Al intermetallic compound microporous material to dense stainless steel; and cooling after completion of the welding.

According to the present disclosure, also provided is a welded part made according to the above method of the present disclosure.

In the welding method of the present disclosure, welding is performed by using fusion welding (e.g. argon arc welding, plasma welding or laser welding, etc.). Moreover, high-quality welding of Fe—Al intermetallic compound microporous material to dense stainless steel is achieved, by using welding wire and providing protection with multi-channel welding shielding gas (i.e., welding shielding gas from the welding torch itself and welding shielding gas newly introduced into the shield) to a joint area during the welding process. Further, through optimization of process parameters (welding current, welding voltage, welding speed, shielding gas flow rate) and preferable selection of GCrMo91 (C<0.1% wt, Cr 8-10% wt, Mo<1% wt), ER310S welding wire or ERNiCr-3 alloy welding wire material, as welding filler, the present disclosure can have better effect.

Fe—Al intermetallic compound microporous material welded by the welding method of the present disclosure is firmly bonded to dense stainless steel and has high stability, with a full and uniform weld seam and no defects such as undercut, surface cracks, seam under-fill, obvious overlap, etc.

DETAILED DESCRIPTION

The technical solutions of the present disclosure will be described below in a clearly and fully understandable way in conjunction with the accompanying drawings. It is obvious that the described embodiments are just a part but not all of the embodiments of the present disclosure. Based on the embodiments in the present disclosure, those skilled in the art can obtain other embodiment(s), without any inventive work, all of which should be within the scope of the disclosure.

Figure 1:
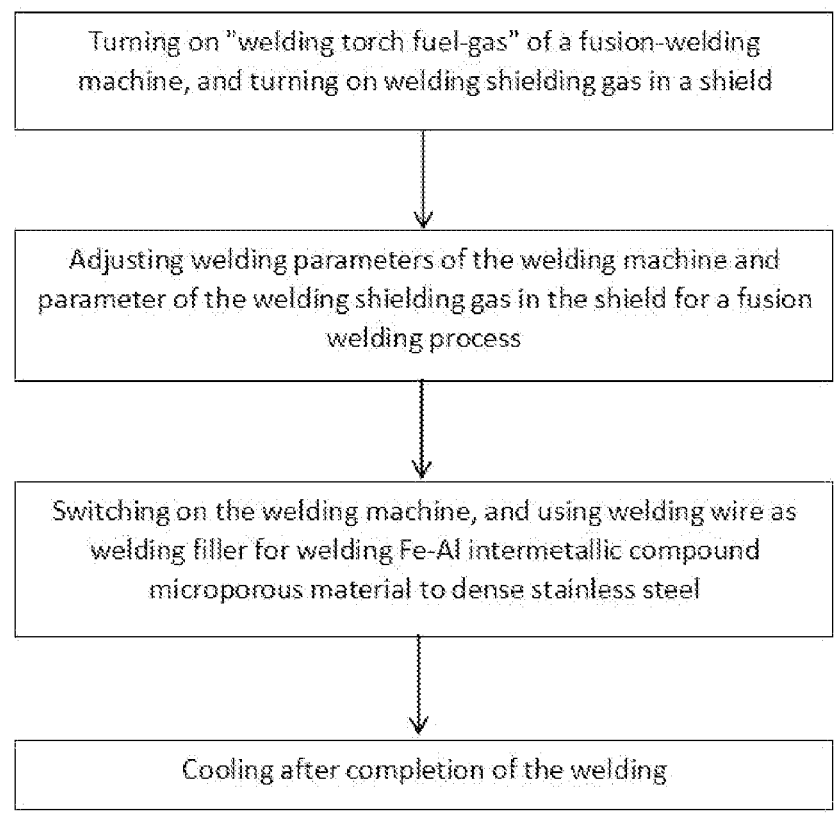
FIG. 1 is a flow chart of a method for welding Fe—Al intermetallic compound microporous material to dense stainless steel, in accordance with an embodiment of the present disclosure.

Referring to FIG. 1, in the method for welding Fe—Al intermetallic compound microporous material to dense stainless steel in accordance with the present disclosure, firstly, turning on "welding torch fuel-gas" of a fusion-welding machine, and turning on welding shielding gas in a shield, in which the shield is used to protect the Fe—Al intermetallic compound microporous material; next, adjusting welding parameters of the welding machine and parameter of the welding shielding gas in the shield for a fusion welding process; then, adjusting welding torch position, pressing an arc start switch, and using welding wire as welding filler for welding the Fe—Al intermetallic compound microporous material to dense stainless steel; and, cooling in the shield after completion of the welding.

In the method for welding Fe—Al intermetallic compound microporous material to dense stainless steel in accordance with the present disclosure, the welding wire material preferably adopts GCrMo91 (C<0.1% wt, Cr 8-10% wt, Mo<1% wt) heat-resistant steel welding wire, ER310S welding wire or ERNiCr-3 welding wire, as welding filler. The welding method adopts fusion welding, and preferably adopts argon arc welding, plasma welding or laser welding for performing welding.

In the welding method of the present disclosure, high-quality welding between the Fe—Al material and solid stainless steel is achieved by using welding wire and providing multi-channel welding shielding gas (i.e., welding shielding gas from the welding torch itself and welding shielding gas newly introduced into the shield) to a joint area during the welding process. Further, through optimization of process parameters (welding current, welding voltage, welding speed, shielding gas flow rate), the present disclosure has better effect.

Figure 2:
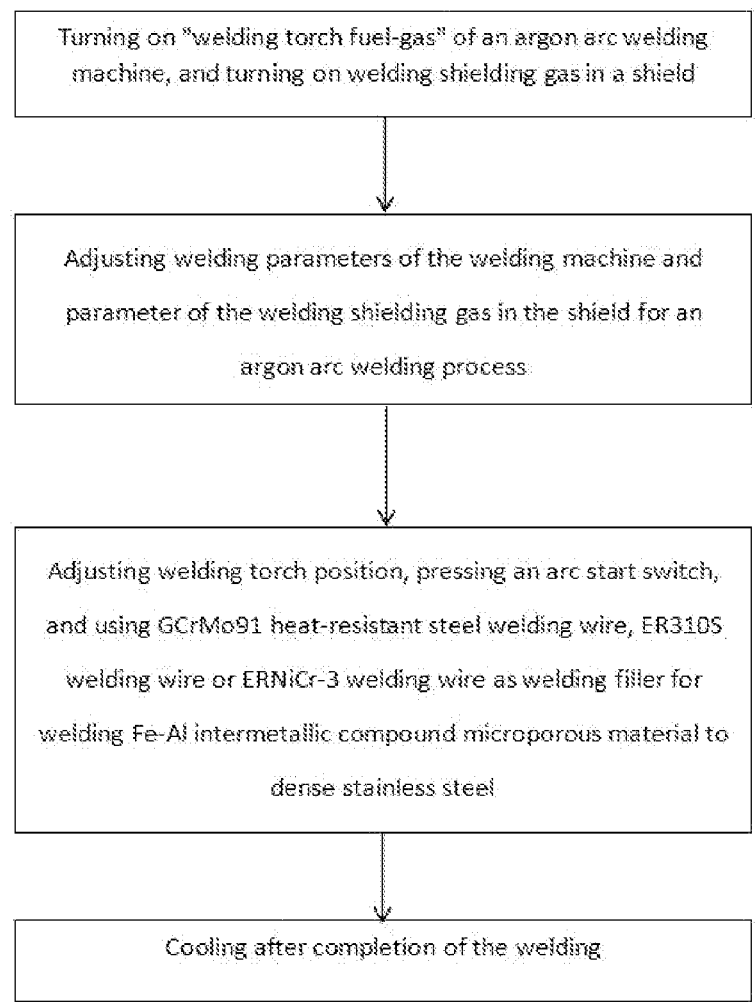
FIG. 2 is a flow chart of the welding method, in accordance with another embodiment of the present disclosure where argon arc welding is used.

FIG. 2 shows a flow chart of the welding method, in accordance with another embodiment of the present disclosure where argon arc welding is used. The steps are as follows: firstly, turning on "welding torch fuel-gas" of an argon arc welding machine, and turning on welding shielding gas in a shield, where the shield is used to protect the Fe—Al intermetallic compound microporous material; next, adjusting welding parameters of the welding machine and parameter of the welding shielding gas in the shield for an argon arc welding process; then, adjusting welding torch position, pressing an arc start switch, and using welding wire, for example, GCrMo91 heat-resistant steel welding wire, or ER310S welding wire or ERNiCr-3 welding wire, as welding filler for welding the Fe—Al intermetallic compound microporous material to dense stainless steel, where the composition in GCrMo91 heat-resistant steel welding wire are C<0.1% wt, Cr 8-10% wt, Mo<1% wt; and, cooling in the shield after completion of the argon arc welding.

In the specific welding method in FIG. 2:

An automatic argon arc girth welding machine is adopted as the argon arc welding equipment; and during welding, Fe—Al alloy in a fusion zone, especially the element Al, is prone to oxidation, therefore, in addition to process parameters such as welding speed, welding voltage, welding current, argon gas flow rate, etc., major focus should be placed on approaches for protecting a welding joint portion (including weld seam, fusion zone, and heat-affected zone) with welding shielding gas. Welding process parameters used with the argon arc welding are: welding current 65-75 A, welding voltage 12.4V, welding speed 150-210 mm/min, in-welding-torch argon gas flow rate 20 L/min, and in-shield argon gas (shielding gas) flow rate 10-15 L/min.

Figure 3:
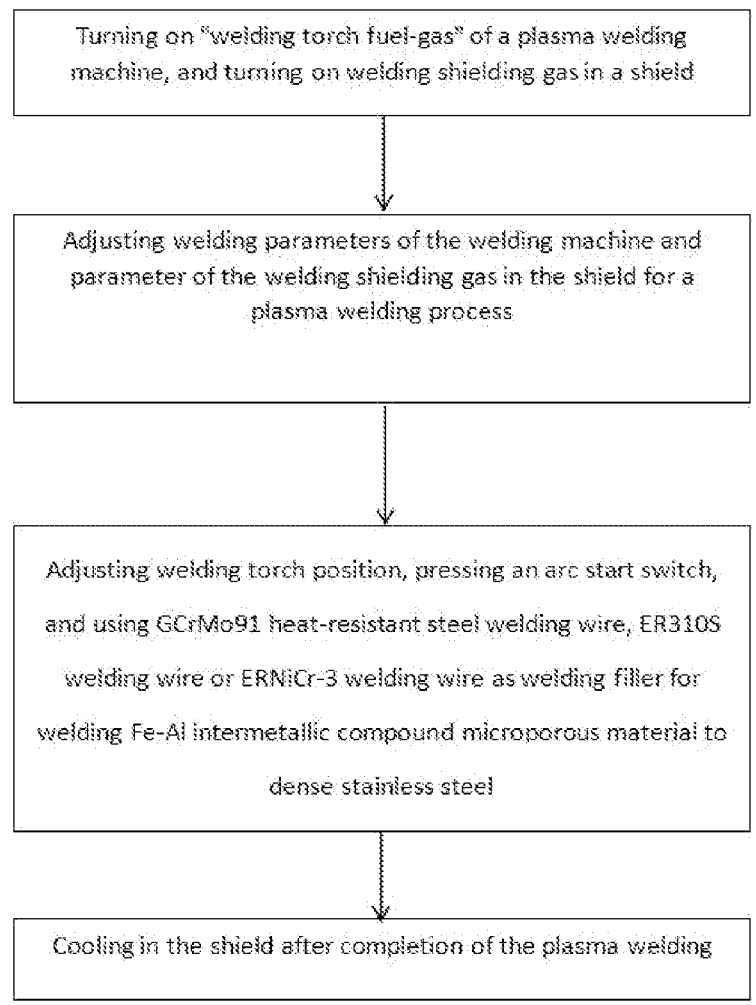
FIG. 3 is a flow chart of the welding method, in accordance with yet another embodiment of the present disclosure where plasma welding is used.

FIG. 3 shows a flow chart of the welding method, in accordance with yet another embodiment of the present disclosure where plasma welding is used. The steps are as follows: firstly, turning on "welding torch fuel-gas" of a plasma welding machine, and turning on welding shielding gas in a shield, where the shield is used to protect the Fe—Al intermetallic compound microporous material; next, adjusting welding parameters of the welding machine and parameter of the welding shielding gas in the shield for a plasma welding process; then, adjusting welding torch position, pressing an arc start switch, and using welding wire, for example, GCrMo91 heat-resistant steel welding wire, or ER310S welding wire or ERNiCr-3 welding wire, as welding filler for welding the Fe—Al intermetallic compound microporous material to dense stainless steel, where the composition in GCrMo91 heat-resistant steel welding wire are C<0.1% wt, Cr 8-10% wt, Mo<1% wt; and, cooling in the shield after completion of the plasma welding.

In the specific welding method in FIG. 3:

A plasma girth welding machine may be preferably adopted as the plasma welding equipment; and process parameters used with the plasma welding are: welding current 50-60 A, argon gas flow rate 10-15 L/min, welding speed 150-180 mm/min, ionized gas flow rate 1±0.1 L/min, and welding wire material adopting GCrMo91 (C<0.1% wt, Cr 8-10% wt, Mo<1% wt) heat-resistant steel welding wire, ER310S welding wire or ERNiCr-3 welding wire as welding filler. Specifically, when performing the welding, the steps are as follows: firstly, turning on "welding torch fuel-gas" of the welding machine, and turning on shielding gas in a shield, where in-shield argon gas (shielding gas) flow rate is 20-25 L/min; then, switching on a rotating mechanism of the plasma girth welding machine, adjusting welding torch position, pressing an arc start switch, and accomplishing the welding by manual filler-wire filling and full welding around whole perimeter; cooling in the shield for 10 seconds, and then taking out the welded part.

Figure 4:
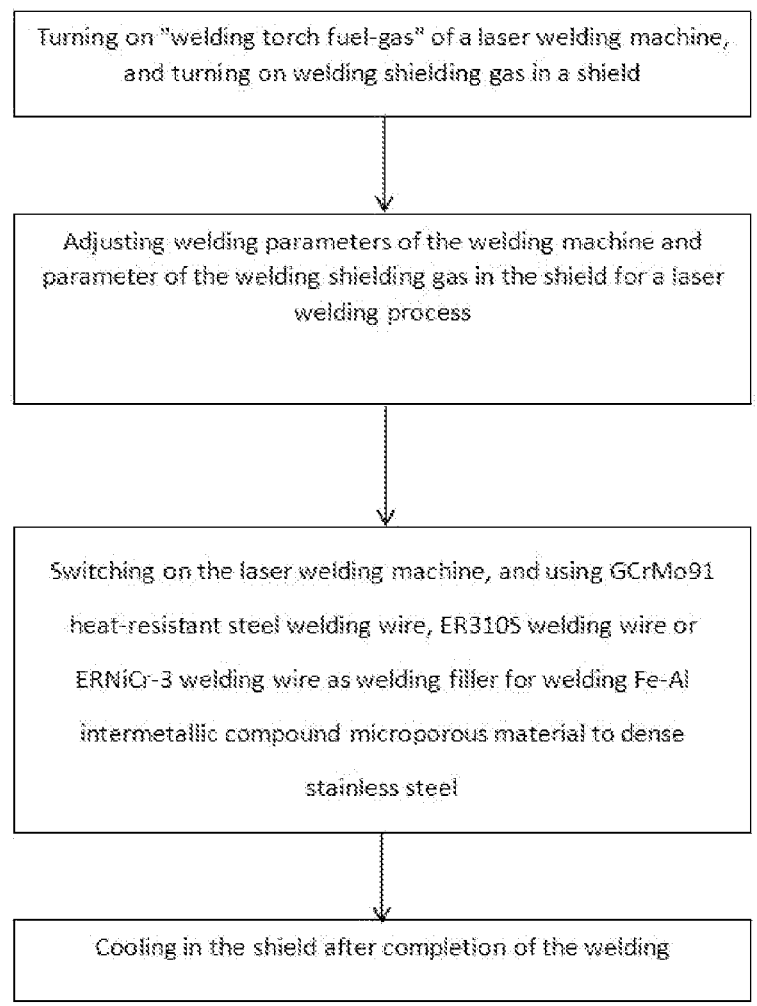
FIG. 4 is a flow chart of the welding method, in accordance with further another embodiment of the present disclosure where laser welding is used.

FIG. 4 shows a flow chart of the welding method, in accordance with further another embodiment of the present disclosure where laser welding is used. The steps are as follows: firstly, turning on "welding torch fuel-gas" of a laser welding machine, and turning on welding shielding gas in a shield, where the shield is used to protect the Fe—Al intermetallic compound microporous material; next, adjusting welding parameters of the welding machine and parameter of the welding shielding gas for a laser welding process; then, switching on the laser welding machine, and using welding wire, for example, GCrMo91 heat-resistant steel welding wire, or ER310S welding wire or ERNiCr-3 welding wire, as welding filler for welding the Fe—Al intermetallic compound microporous material to dense stainless steel, where the composition in GCrMo91 heat-resistant steel welding wire are C<0.1% wt, Cr 8-10% wt, Mo<1% wt; and, cooling in the shield after completion of the laser welding.

In the specific welding method in FIG. 4:

Welding process parameters used with the laser welding are: welding power 2-3 kw, welding speed 50-100 mm/min, wire feed speed 85-100 mm/s, defocusing amount 6-10 mm, and in-shield argon gas (shielding gas) flow rate 20-25 L/min.

With the above methods of the present disclosure, welding portion on a welded part formed by welding Fe—Al intermetallic compound microporous material to dense stainless steel, is firmly bonded and have high stability, with a full and uniform weld seam and no defects such as undercut, surface cracks, seam under-fill, obvious overlap, etc.

That is, in the welding method of the present disclosure, preferable is that:

(1) Fusion welding is performed using argon arc welding, plasma welding or laser welding. High-quality welding between Fe—Al intermetallic compound microporous material and solid stainless steel is accomplished by using welding wire and providing protection with multi-channel shielding gas (i.e., welding shielding gas from the welding torch itself and welding shielding gas newly introduced into the shield) to a joint area during the welding process. Further, through optimization of process parameters, the present disclosure can have better effect.

(2) Welding wire material adopts GCrMo91 (C<0.1% wt, Cr 8-10% wt, Mo<1% wt) heat-resistant steel welding wire, ER310S welding wire or ERNiCr-3 alloy, as welding filler.

In the above welding method of the present disclosure, effective connection of Fe—Al intermetallic compound microporous material to dense stainless steel is achieved by optimizing welding wire, welding current, welding speed, argon gas flow rate (after welding, tensile strength of a sample is tested with a material universal testing machine, hardness of a welding joint is tested with a Broadway optical hardness tester, microstructure and morphology, composition and phase composition of a welding joint are observed and analyzed with a metallurgical microscope, scanning electron microscope, energy spectrum and X-ray diffractometer, and based on that, a welding process is optimized), as well as approaches for protecting welding joint (i.e., welding shielding gas in a shield is introduced). Weld tensile strength can reach 35-40 MPa, which is higher than strength of ceramic filter material, and the tensile fracture site located in a powder body heat-affected zone. Vibration-based bending fatigue strength of the welding joint is greater than 300 N, three-point flexural strength is greater than 700 N, and the fracture site is also located in a powder body heat-affected zone immediately adjacent to a weld seam. Weld seams are smooth in appearance, full and uniform, with no defects such as undercut, surface cracks, seam under-fill, obvious overlap, internal cracks, slag inclusions, etc.

In order to further describe the welding method of the present disclosure with more clarity, given below are specific implementation of the Fe—Al intermetallic compound microporous material of the present disclosure in the form of $Fe_3Al$ and FeAl intermetallic compound tubes respectively, various examples of their welding to various dense stainless steel connection rings, and their welding results, wherein various specific implementation parameters of actual welding processes are also set out in detail.

Example 1:

Welding of $Fe_3Al$ intermetallic compound tube to 310S stainless steel connection ring is carried out, with argon arc welding process parameters as follows: current 65 A, voltage 12.4V, welding speed 150 mm/min, argon gas flow rate 20 L/min, in-shield argon gas flow rate 10-15 L/min, and welding wire material adopting GCrMo91 (C<0.1% wt, Cr 8-10% wt, Mo<1% wt) heat-resistant steel welding wire as welding filler. Resulting weld seam is full and uniform, with no defects such as undercut, surface cracks, seam under-fill, obvious overlap, internal cracks, slag inclusions, etc., and weld tensile strength reaches 37 MPa.

Example 2:

Welding of $Fe_3Al$ intermetallic compound tube to 310S stainless steel connection ring is carried out, with argon arc welding process parameters as follows: current 70 A, voltage 12.4 V, welding speed 180 mm/min, argon gas flow rate 20 L/min, in-shield argon gas flow rate 10-15 L/min, and welding wire material adopting ER310S welding wire as welding filler. Resulting weld seam is full and uniform, with no defects such as undercut, surface cracks, seam under-fill, obvious overlap, internal cracks, slag inclusions, etc., and weld tensile strength reaches 39 MPa.

Example 3:

Welding of $Fe_3Al$ intermetallic compound tube to 304 stainless steel connection ring is carried out, with argon arc welding process parameters as follows: current 75 A, voltage 12.4V, welding speed 210 mm/min, argon gas flow rate 20 L/min, in-shield argon gas flow rate 10-15 L/min, and welding wire material adopting ERNiCr-3 welding wire as welding filler. Resulting weld seam is full and uniform, with no defects such as undercut, surface cracks, seam under-fill, obvious overlap, internal cracks, slag inclusions, etc., and weld tensile strength reaches 36 MPa.

Example 4:

Welding of $Fe_3Al$ intermetallic compound tube to 304 stainless steel connection ring is carried out, with process parameters as follows: plasma welding current 60 A, argon gas flow rate 15 L/min, welding speed 180 mm/min, ionized gas flow rate 1 L/min, and welding wire material adopting ERNiCr-3 welding wire as welding filler. When performing the welding, operations are as follows: firstly, turning on "welding torch fuel-gas" and in-shield gas, where in-shield argon gas flow rate is 20-25 L/min; then, switching on a rotating mechanism of a plasma girth welding machine, adjusting welding torch position, pressing an arc start switch, and accomplishing the welding by manual filler-wire filling and full welding around whole perimeter; cooling in the shield for 10 seconds, and then taking out the welded filter. Resulting weld seam is full and uniform, with no defects such as undercut, surface cracks, seam under-fill, obvious overlap, internal cracks, slag inclusions, etc., and weld tensile strength reaches 37 MPa.

Example 5:

Welding of $Fe_3Al$ intermetallic compound tube to 316 stainless steel connection ring is carried out, with process parameters as follows: plasma welding current 50 A, argon gas flow rate 10 L/min, welding speed 150 mm/min, ionized gas flow rate 1 L/min, and welding wire material adopting ER310S welding wire as welding filler. When performing the welding, operations are as follows: firstly, turning on "welding torch fuel-gas" and in-shield gas, where in-shield argon gas flow rate is 20-25 L/min; then, switching on a rotating mechanism of a plasma girth welding machine, adjusting welding torch position, pressing an arc start switch, and accomplishing the welding by manual filler-wire filling and full welding around whole perimeter; cooling in the shield for 10 seconds, and then taking out the welded filter. Resulting weld seam is full and uniform, with no defects such as undercut, surface cracks, seam under-fill, obvious overlap, internal cracks, slag inclusions, etc., and weld tensile strength reaches 35 MPa.

Example 6:

Welding of $Fe_3Al$ intermetallic compound tube to 310S stainless steel connection ring is carried out, with process parameters as follows: plasma welding current 55 A, argon gas flow rate 13 L/min, welding speed 160 mm/min, ionized gas flow rate 1 L/min, and welding wire material adopting ERNiCr-3 welding wire as welding filler. When performing the welding, operations are as follows: firstly, turning on "welding torch fuel-gas" and in-shield gas, where in-shield argon gas flow rate is 20-25 L/min; then, switching on a rotating mechanism of a plasma girth welding machine, adjusting welding torch position, pressing an arc start switch, and accomplishing the welding by manual filler-wire filling and full welding around whole perimeter; cooling in the shield for 10 seconds, and then taking out the welded filter. Resulting weld seam is full and uniform, with no defects such as undercut, surface cracks, seam under-fill, obvious overlap, internal cracks, slag inclusions, etc., and weld tensile strength reaches 39 MPa.

Example 7:

Welding of $Fe_3Al$ intermetallic compound tube to 316L stainless steel connection ring is carried out, with laser welding process parameters as follows: welding power 2.35 kw, welding speed 60 mm/min, wire feed speed 100 mm/s (without chamfer) or 85 mm/s (with chamfer), welding duration 19.1 s at defocusing amount of 8 mm, in-shield argon gas flow rate 20-25 L/min, and welding wire material adopting GCrMo91 (C<0.1% wt, Cr 8-10% wt, Mo<1% wt) heat-resistant steel welding wire as welding filler. Resulting weld seam is full and uniform, with no defects such as undercut, surface cracks, seam under-fill, obvious overlap, internal cracks, slag inclusions, etc., and weld tensile strength reaches 35 MPa.

Example 8:

Welding of $Fe_3Al$ intermetallic compound tube to 310S stainless steel connection ring is carried out, with laser welding process parameters as follows: welding power 2kw, welding speed 50 mm/min, wire feed speed 100 mm/s (without chamfer) or 85 mm/s (with chamfer), defocusing amount 6 mm, in-shield argon gas flow rate 20-25 L/min, and welding wire material adopting GCrMo91 (C<0.1% wt, Cr 8-10% wt, Mo<1% wt) heat-resistant steel welding wire as welding filler. Resulting weld seam is full and uniform, with no defects such as undercut, surface cracks, seam under-fill, obvious overlap, internal cracks, slag inclusions, etc., and weld tensile strength reaches 37 MPa.

Example 9:

Welding of $Fe_3Al$ intermetallic compound tube to 304 stainless steel connection ring is carried out, with laser welding process parameters as follows: welding power 3 kw, welding speed 100 mm/min, wire feed speed 100 mm/s (without chamfer) or 85 mm/s (with chamfer), defocusing amount 10 mm, in-shield argon gas flow rate 20-25 L/min, and welding wire material adopting ERNiCr-3 welding wire as welding filler. Resulting weld seam is full and uniform, with no defects such as undercut, surface cracks, seam under-fill, obvious overlap, internal cracks, slag inclusions, etc., and weld tensile strength reaches 39 MPa.

Example 10:

Welding of FeAl intermetallic compound tube to 310S stainless steel connection ring is carried out, with process parameters as follows: plasma welding current 58 A, argon gas flow rate 15 L/min, welding speed 160 mm/min, ionized gas flow rate 1 L/min, and welding wire material adopting ERNiCr-3 welding wire as welding filler. When performing the welding, operations are as follows: firstly, turning on "welding torch fuel-gas" and in-shield gas, where in-shield argon gas flow rate is 20-25 L/min; then, switching on a rotating mechanism of a plasma girth welding machine, adjusting welding torch position, pressing an arc start switch, and accomplishing the welding by manual filler-wire filling and full welding around whole perimeter; cooling in the shield for 10 seconds, and then taking out the welded filter. Resulting weld seam is full and uniform, with no defects such as undercut, surface cracks, seam under-fill, obvious overlap, internal cracks, slag inclusions, etc., and weld tensile strength reaches 38 MPa.

It should be noted that, based on the above detailed description of the present disclosure, a person skilled in the art can fully and clearly envisage similar embodiments for other Fe—Al intermetallic compounds, such as $FeAl_2$, $Fe_2Al_5$, $FeAl_3$, etc.; furthermore, in the present disclosure, although argon gas is used as welding shielding gas, a person skill in the art can fully understand other embodiments using similar inert welding shielding gas. Therefore, description of them will be omitted.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A method for welding Fe—Al intermetallic compound microporous material to dense stainless steel, wherein, the welding method comprises the steps of:

turning on "welding torch fuel-gas" of a fusion-welding machine, and turning on welding shielding gas in a shield, wherein the shield gas is used to protect the Fe—Al intermetallic compound microporous material, and in-shield argon gas (shielding gas) flow rate is 20-25 L/min;

adjusting welding parameters of the welding machine and parameter of the welding shielding gas in the shield for a fusion welding process;

switching on a rotating mechanism of a plasma girth the welding machine, adjusting welding torch position, pressing an arc start switch; using welding wire as welding filler to perform welding of the Fe—Al intermetallic compound microporous material to dense stainless steel and accomplishing the welding by manual filler-wire filling and full welding around whole perimeter, wherein the welding wire adopts GCrMo91 welding wire, ER310S welding wire or ERNiCr-3 welding wire, where the composition in GCrMo91 are C<0.1% wt, Cr 8~10% wt, Mo<1% wt; and cooling in the shield after completion of the welding for at least 10 seconds and then taking out a welded part;

wherein the fusion welding adopts plasma welding, and the welding parameters of the welding machine are adjusted as follows: welding current 50-60 A, argon-gas flow rate 10-15 L/min, welding speed 150-180 mm/min, ionized gas flow rate 1±0.1 L/min, meanwhile, the parameter of the welding shielding gas in the shield is adjusted to: shielding-gas flow rate 20-25 L/min.

2. The welding method according to claim 1, wherein, $Fe_3Al$ intermetallic compound microporous tubular filter material is adopted and welded to a dense-stainless-steel connection ring.

3. The welding method according to claim 2, wherein, after completion of welding, cooling is implemented in the shield for 10 seconds.

4. A method for welding Fe—Al intermetallic compound microporous material to dense stainless steel, wherein, the welding method comprises the steps of:

turning on "welding torch fuel-gas" of a fusion-welding machine, and turning on welding shielding gas in a shield, wherein the shield gas is used to protect the Fe—Al intermetallic compound microporous material, and in-shield argon gas (shielding gas) flow rate is 20-25 L/min;

adjusting welding parameters of the welding machine and parameter of the welding shielding gas in the shield for a fusion welding process;

switching on the welding machine, using welding wire as welding filler to perform welding of the Fe—Al intermetallic compound microporous material to dense stainless steel, and accomplishing the welding by manual filler-wire filling and full welding around whole perimeter wherein welding wire material adopts GCrMo91 (C<0.1% wt, Cr<8-10% wt, Mo<1% wt) heat-resistant steel welding wire, ER310S welding wire or ERNiCr-3 alloy, as welding filler; and cooling after completion of the welding;

wherein the fusion welding adopts laser welding, and the welding parameters of the welding machine are adjusted as follows: welding power 2-3 kw, welding speed 50-100 mm/min, wire feed speed 85-100 mm/s, and defocusing amount 6-10 mm, meanwhile, the parameter of the welding shielding gas in the shield is adjusted to: shielding gas flow rate 20-25 L/min.

5. The welding method according to claim 4, wherein, $Fe_3Al$ intermetallic compound microporous tubular filter material is adopted and welded to a dense-stainless-steel connection ring.

6. The welding method according to claim 5, wherein, after completion of welding, cooling is implemented in the shield for 10 seconds.

7. A welded part made by the welding method according to claim 1.

8. The welded part made by the welding method according claim 7, wherein, $Fe_3Al$ intermetallic compound microporous tubular filter material is adopted and welded to a dense-stainless-steel connection ring.

9. The welded part made by the welding method according claim 8, wherein, after completion of welding, cooling is implemented in the shield for 10 seconds.

10. The welded part made by the welding method according to claim 4.

11. The welded part made by the welding method according to claim 10, wherein, Fe$_3$Al intermetallic compound microporous tubular filter material is adopted and welded to the dense-stainless-steel connection ring.

12. The welded part made by the welding method according to claim 11, wherein, after completion of welding, cooling is implemented in the shield for 10 seconds.

13. The welding method according to claim 3, wherein the plasma welding current 60 A, the argon gas flow rate 15 L/min, the welding speed 180 mm/min, the ionized gas flow rate 1 L/min, and the welding wire material adopting ERNiCr-3 welding wire as the welding filler.

14. The welding method according to claim 3, wherein the plasma welding current 50 A, the argon gas flow rate 10 L/min, the welding speed 150 mm/min, the ionized gas flow rate 1 L/min, and the welding wire material adopting ER310S welding wire as the welding filler.

15. The welding method according to claim 3, wherein the plasma welding current 55 A, the argon gas flow rate 13 L/min, the welding speed 160 mm/min, the ionized gas flow rate 1 L/min, and the welding wire material adopting ERNiCr-3 welding wire as the welding filler.

16. The welding method according to claim 5, wherein the welding power 2.35 kw, the welding speed 60 mm/min, the wire feed speed 100 mm/s (without chamfer) or 85 mm/s (with chamfer), the welding duration 19.1 s at defocusing amount of 8 mm, the in-shield argon gas flow rate 20-25 L/min, and the welding wire material adopting GCrMo91 (C<0.1% wt, Cr<8-10% wt, Mo<1% wt) heat-resistant steel welding wire as the welding filler.

17. The welding method according to claim 5, wherein the welding power 2 kw, the welding speed 50 mm/min, the wire feed speed 100 mm/s (without chamfer) or 85 mm/s (with chamfer), the defocusing amount 6 mm, the in-shield argon gas flow rate 20-25 L/min, and the welding wire material adopting GCrMo91 (C<0.1% wt, Cr<8-10% wt, Mo<1% wt) heat-resistant steel welding wire as the welding filler.

18. The welding method according to claim 5, wherein the welding power 3 kw, the welding speed 100 mm/min, the wire feed speed 100 mm/s (without chamfer) or 85 mm/s (with chamfer), the defocusing amount 10 mm, the in-shield argon gas flow rate 20-25 L/min, and the welding wire material adopting ERNiCr-3 welding wire as the welding filler.

* * * * *